(12) United States Patent
Sakamoto et al.

(10) Patent No.: US 12,093,061 B2
(45) Date of Patent: Sep. 17, 2024

(54) MOVABLE BODY CONTROL DEVICE, MOVABLE BODY, MOVABLE BODY MANAGEMENT SYSTEM, MOVABLE BODY CONTROL METHOD, AND PROGRAM

(71) Applicant: HONDA MOTOR CO., LTD., Tokyo (JP)

(72) Inventors: Tomokazu Sakamoto, Wako (JP); Shinichiro Kobashi, Wako (JP); Takeshi Echizenya, Wako (JP); Taiki Iimura, Wako (JP); Takayuki Nakagawara, Tokyo (JP); Etsuko Takasugi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 592 days.

(21) Appl. No.: 17/330,450

(22) Filed: May 26, 2021

(65) Prior Publication Data

US 2021/0373551 A1 Dec. 2, 2021

(30) Foreign Application Priority Data

Jun. 1, 2020 (JP) ................. 2020-095434

(51) Int. Cl.
*G05D 1/65* (2024.01)
*B60R 16/023* (2006.01)
(Continued)

(52) U.S. Cl.
CPC ............. *G05D 1/65* (2024.01); *B60R 16/023* (2013.01); *G05D 1/0016* (2013.01);
(Continued)

(58) Field of Classification Search
CPC ...... G05D 1/0016; G05D 1/0223; G05D 1/65; G05D 1/43; G05D 1/648; G05D 1/6482;
(Continued)

(56) References Cited

U.S. PATENT DOCUMENTS 10,282,625 B1 * 5/2019 Wengreen .......... G01C 21/3484
2014/0337077 A1 * 11/2014 Zsebedics ...... G06Q 10/063114
705/7.15

(Continued)

FOREIGN PATENT DOCUMENTS

JP 2015-083417 4/2015
JP 2015-194924 11/2015
(Continued)

OTHER PUBLICATIONS

Translation of WO-2017109845-A1, 27 pages (Year: 2017).*
Japanese Office Action for Japanese Patent Application No. 2020-095434 mailed Oct. 17, 2023.

*Primary Examiner* — Dale W Hilgendorf
(74) *Attorney, Agent, or Firm* — Amin, Turocy & Watson, LLP

(57) ABSTRACT

A movable body control device controls a movable body which a worker who performs a work task at a workplace is capable of boarding and which is capable of traveling in a state where the worker is boarding. The movable body control device includes: an acquisition part that acquires, from a terminal device that is carried by the worker and that receives information which is input by the worker in accordance with the work task, information based on input information which is input by the worker in accordance with the work task; and a control part that controls a speed of the movable body based on the information which is acquired by the acquisition part.

7 Claims, 11 Drawing Sheets

(51) Int. Cl.
*G05D 1/00* (2024.01)
*G05D 1/43* (2024.01)
*G05D 1/648* (2024.01)
*G06Q 10/0631* (2023.01)
*H04W 4/44* (2018.01)

(52) U.S. Cl.
CPC ............ *G05D 1/0223* (2013.01); *G05D 1/43* (2024.01); *G05D 1/648* (2024.01); *G05D 1/6482* (2024.01); *G06Q 10/063114* (2013.01); *H04W 4/44* (2018.02); *A61G 2203/12* (2013.01)

(58) Field of Classification Search
CPC ......... B60R 16/023; G06Q 10/063114; H04W 4/44; A61G 2203/12
See application file for complete search history.

(56) References Cited

U.S. PATENT DOCUMENTS

| | | | | |
|---|---|---|---|---|
| 2017/0323267 | A1* | 11/2017 | Baek | G06Q 10/063114 |
| 2018/0308037 | A1* | 10/2018 | Cloyd | G06Q 10/063114 |
| 2019/0197454 | A1* | 6/2019 | Muta | G08G 1/202 |
| 2019/0231619 | A1* | 8/2019 | Moore | A61G 5/045 |
| 2020/0013287 | A1* | 1/2020 | Kaneko | G07C 5/008 |
| 2020/0021960 | A1* | 1/2020 | Hwang | G06Q 10/0635 |
| 2020/0166354 | A1* | 5/2020 | Ikemoto | G01C 21/3438 |
| 2020/0282834 | A1* | 9/2020 | Endo | B60K 35/00 |
| 2020/0307555 | A1* | 10/2020 | Van Wiemeersch | G05D 1/0022 |
| 2020/0355517 | A1* | 11/2020 | Hashimoto | G08G 1/09 |

FOREIGN PATENT DOCUMENTS

| | | | |
|---|---|---|---|
| JP | 20105-194924 | 11/2015 | |
| JP | 2016-184276 | 10/2016 | |
| JP | 2017-167995 | 9/2017 | |
| JP | 2018-173827 | 11/2018 | |
| JP | 2019-148916 | 9/2019 | |
| WO | WO-2017109845 A1 * | 6/2017 | ............ B65G 1/137 |
| WO | 2019/187855 | 10/2019 | |

* cited by examiner

WHEN BEING RAISED

FIG. 12

260  WORKER001

|  | BETWEEN INSTRUMENT A AND INSTRUMENT B |
|---|---|
| DAY1 | ○○km/h |
| DAY2 | ▲▲km/h |
| DAY3 | ××km/h |
| ... | ... |
| DAY10 | ○○km/h |

MOVABLE BODY CONTROL DEVICE, MOVABLE BODY, MOVABLE BODY MANAGEMENT SYSTEM, MOVABLE BODY CONTROL METHOD, AND PROGRAM

CROSS-REFERENCE TO RELATED APPLICATION

Priority is claimed on Japanese Patent Application No. 2020-095434, filed on Jun. 1, 2020, the contents of which are incorporated herein by reference.

BACKGROUND

Field of the Invention

The present invention relates to a movable body control device, a movable body, a movable body management system, a movable body control method, and a program.

Background

In the related art, a vehicle control device is disclosed that controls a vehicle on the basis of environment information regarding the travel environment of the vehicle, behavior information regarding the behavior of the vehicle, and behavior tendency information indicating a particular relationship between a particular travel environment and a particular behavior (for example, Japanese Unexamined Patent Application, First Publication No. 2019-148916).

As a related art, a control device described in PCT International Publication No. WO2019/187855 is disclosed.

SUMMARY

In the related art described above, the vehicle is controlled without considering a work task that is performed by a worker who boards a movable body, and useful control for the worker or a facility operation may not be realized.

An aspect of the present invention aims to provide a movable body control device, a movable body, a movable body management system, a movable body control method, and a program capable of realizing useful control for a worker or a facility operation.

A movable body control device according to a first aspect of the present invention is a movable body control device that controls a movable body which a worker who performs a work task at a workplace is capable of boarding and which is capable of traveling in a state where the worker is boarding, the movable body control device including: an acquisition part that acquires, from a terminal device that is carried by the worker and that receives information which is input by the worker in accordance with the work task, information based on input information which is input by the worker in accordance with the work task; and a control part that controls a speed of the movable body based on the information which is acquired by the acquisition part.

A second aspect of the present invention is the movable body control device according to the first aspect described above, wherein the work task may be a work task by which the worker confirms information that is indicated by equipment which is provided at the workplace.

A third aspect of the present invention is the movable body control device according to the first or second aspect described above, wherein the input information may be information indicating that the work task has started, information that is indicated by equipment which is provided at the workplace, information indicating that the worker has confirmed information that is indicated by equipment which is provided at the workplace, or information indicating that the work task has been completed.

A fourth aspect of the present invention is the movable body control device according to any of the first to third aspects described above, wherein the control part may set a first upper speed limit and a second upper speed limit, the work task may include a first work task and a second work task that are performed by the worker, the first upper speed limit may be an upper speed limit that is set when moving from a position where the first work task is performed to a position where the worker performs the second work task that is performed next, and the second upper speed limit may be an upper speed limit that is set when moving from the position where the worker performs the second work task to a position where the worker performs a third work task that is performed next.

A fifth aspect of the present invention is the movable body control device according to any of the first to fourth aspects described above, wherein the control part may set an upper speed limit of the movable body based on a work schedule of a different worker and the information based on the input information.

A sixth aspect of the present invention is the movable body control device according to any of the first to fifth aspects described above, wherein the control part may set an upper speed limit of the movable body based on predetermined information and the information based on the input information, and the predetermined information may include some or all of a degree of congestion near a passage on which the movable body travels, a use history of the movable body by the worker, a state of a battery mounted on the movable body, a state of a road surface of a passage on which the movable body is scheduled to travel, a learning level regarding use of the movable body of the worker, and a type of passage on which the movable body is scheduled to travel.

A seventh aspect of the present invention is a movable body on which the movable body control device according to any of the first to sixth aspects described above is mounted.

An eighth aspect of the present invention is a movable body management system, including: the movable body control device according to any of the first to seventh aspects described above; and a server device that acquires input information from the terminal device and that provides information generated based on the acquired input information to the movable body control device.

A ninth aspect of the present invention is a movable body control method by way of a computer that controls a movable body which a worker who performs a work task at a workplace is capable of boarding and which is capable of traveling in a state where the worker is boarding, the movable body control method including: acquiring, from a terminal device that is carried by the worker and that receives information which is input by the worker in accordance with the work task, information based on input information which is input by the worker in accordance with the work task; and controlling a speed of the movable body based on the information which is acquired.

A tenth aspect of the present invention is a computer-readable non-transitory recording medium which includes a program causing a computer that controls a movable body which a worker who performs a work task at a workplace is capable of boarding and which is capable of traveling in a state where the worker is boarding to: acquire, from a terminal device that is carried by the worker and that receives information which is input by the worker in accordance with the work task, information based on input information which is input by the worker in accordance with the work task; and control a speed of the movable body based on the information which is acquired.

According to the first to tenth aspects described above, since the movable body control device controls the speed of the movable body on the basis of the input information which is input in accordance with the work task, it is possible to realize useful control for the worker or the facility operation. For example, since the upper speed limit and the speed for each position are set in accordance with the progress of the work task, the worker can easily perform travel of the movable body in accordance with the progress of the work task.

According to the fifth aspect described above, since the work schedule of another worker is further taken into consideration, a more appropriate upper speed limit can be set.

According to the sixth aspect described above, the predetermined information that affects the movement of the movable body is further taken into consideration, and thereby, an appropriate upper speed limit for the environment and situation when the work task is performed can be set.

BRIEF DESCRIPTION OF THE DRAWINGS

FIG. 12 is a view showing an example of history information of a worker stored in the storage part of the management device.

DESCRIPTION OF EMBODIMENTS

Hereinafter, an embodiment of a movable body management system that includes a movable body control device, a movable body, a movable body management system, a movable body control method, and a program of the present invention will be described with reference to the drawings. The movable body control device controls a movable body on which a worker who performs a work task at a workplace is capable of boarding and which is capable of traveling in a state where the worker is boarding. The movable body control device is, for example, mounted on the movable body described above and performs a variety of processes in a coordinated manner with another device included in the movable body management system.

First Embodiment

[Overall Configuration]

Figure 1:
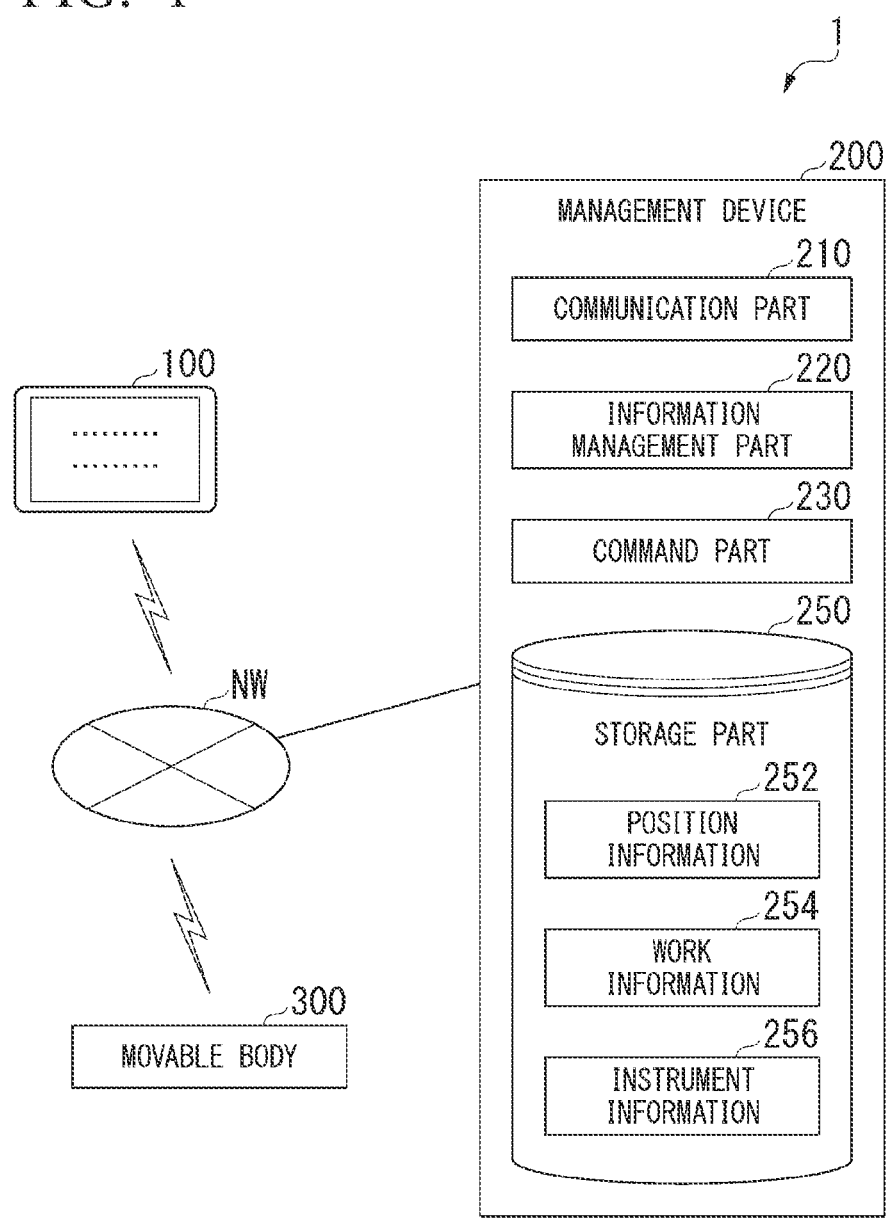
FIG. 1 is a view showing an example of a functional configuration of a movable body management system.

FIG. 1 is a view showing an example of a functional configuration of a movable body management system 1. The movable body management system 1 includes a terminal device 100, a management device 200, and a movable body 300. These communicate with one another via a network NW. The network NW includes the Internet, a WAN (Wide Area Network), a LAN (Local Area Network), a public line, a provider device, a dedicated line, a wireless base station, and the like. A control device that is included in the management device 200 or the movable body 300 is an example of a "movable body control device".

[Terminal Device]

The terminal device 100 is, for example, a smartphone, a tablet terminal, or the like. In the terminal device 100, an application program, a browser, or the like for utilizing a service provided by the movable body management system 1 is started, and the service described below is supported. In the following description, it is assumed that the terminal device 100 is a tablet terminal, and the application program (service application) for receiving the service is started. The service application communicates with the management device 200 in response to an operation of a worker, transmits information that is input by the worker to the management device 200, and provides information on the basis of information that is received from the management device 200.

[Management Device]

The management device 200 includes, for example, a communication part 210, an information management part 220, a command part 230, and a storage part 250. The information management part 220 and the command part 230 are implemented, for example, by a processor such as a CPU (Central Processing Unit) as hardware executing a program (software). Some or all of the information management part 220 and the command part 230 may be implemented by hardware (a circuit part including circuitry) such as an LSI (Large-Scale Integration), an ASIC (Application-Specific Integrated Circuit), a FPGA (Field-Programmable Gate Array), or a GPU (Graphics-Processing Unit) or may be implemented by software and hardware in cooperation. The program may be stored in advance in a storage device (a storage device including a non-transitory storage medium) such as a HDD (Hard Disk Drive) or a flash memory. The program may be stored in a removable storage medium (a non-transitory storage medium) such as a DVD or a CD-ROM and be installed in the storage device by the storage medium being mounted on a drive device. The storage part 250 is implemented by a HDD (Hard Disc Drive), a DVD, a RAM (Random-Access Memory), a flash memory, or the like. Position information 252, work information 254, instrument information 256, and the like are stored in the storage part 250. The position information 252 includes position information of the movable body 300 in a time series. Details of other information are described later.

The communication part 210 is, for example, a wireless communication module for connecting to a network NW or communicating directly with another terminal device or the like. The communication part 210 performs wireless communication on the basis of Wi-Fi, DSRC (Dedicated Short-Range Communications), Bluetooth (Registered Trademark), or other communication standards.

The information management part 220 manages information that is provided by the terminal device 100 or the movable body 300. For example, the information management part 220 stores the information that is provided by the terminal device 100 or the movable body 300 in the storage part 250. The information management part 220 provides the information stored in the storage part 250 or information based on the information stored in the storage part 250 to the terminal device 100 or the movable body 300.

The command part 230 gives a command to the movable body 300 on the basis of the information that is provided by the terminal device 100. The command is a command regarding a direction in which the movable body 300 proceeds, the height of the movable body 300, and the like. The command may include a speed, a route, trajectory information, and the like when the movable body proceeds to a destination. The trajectory information is information in which the position and the speed in a time series when the movable body 300 moves are associated with each other.

[Movable Body]

Figure 2:
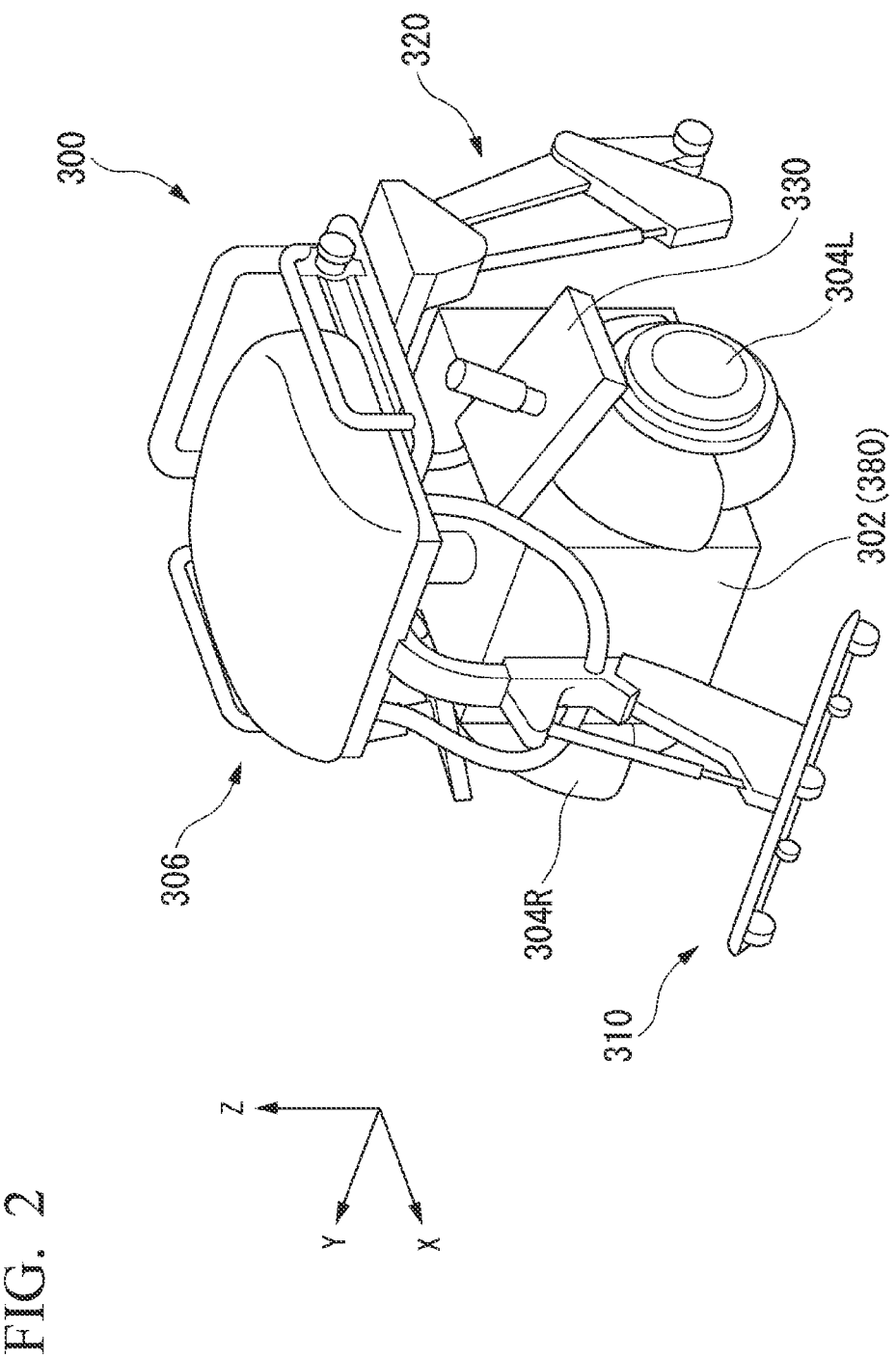
FIG. 2 is a perspective view showing a movable body.

FIG. 2 is a perspective view showing the movable body 300. Hereinafter, a front-to-rear direction of the movable body may be referred to as an X direction, a lateral direction may be referred to as a Y direction, and a direction perpendicular to the X direction and the Y direction may be referred to as a Z direction. The movable body 300 is a movable body on which a worker who performs a work task at a workplace is capable of boarding and which is capable of adjusting the height of a boarding part on which the worker boards.

The movable body 300 includes, for example, a base body 302, a wheel 304R and a wheel 304L that are attached to the base body 302, a seat part 306 like a cushion on which a passenger is seated, a lifting mechanism 308 (refer to FIG. 3 described later) that drives the seat part 306, a first support part 310, a second support part 320, and an operation part 330. A control device 380 described later, a motor, a battery, and the like are accommodated inside the base body 302.

The present embodiment is described using an example in which the movable body 300 as shown in FIG. 2 is used; however, the movable body is not limited to a movable body 300 as shown in FIG. 2 and may be a movable body in which a worker rides on a step in a state of standing. A mechanism such as an endless track may be used in place of the wheel 304R and the wheel 304L.

The wheel 304R is provided on a +Y direction side of the movable body 300. The wheel 304L is provided on a −Y direction side of the movable body 300. The wheel 304R and the wheel 304L are driven by the motor. The seat part 306 is arranged above the base body 302. An upper surface of the seat part 306 is a seat surface that supports the hip of the passenger from below. The seat part 306 is supported by the base body 302 via the lifting mechanism 308. Details of the first support part 310 and the second support part 320 are described below.

The operation part 330 includes an operation element for the worker to control an operation of the movable body 300. For example, the operation element is an operation element for controlling the speed of the movable body 300, a braking operation, and the lifting mechanism 308.

Figure 3:
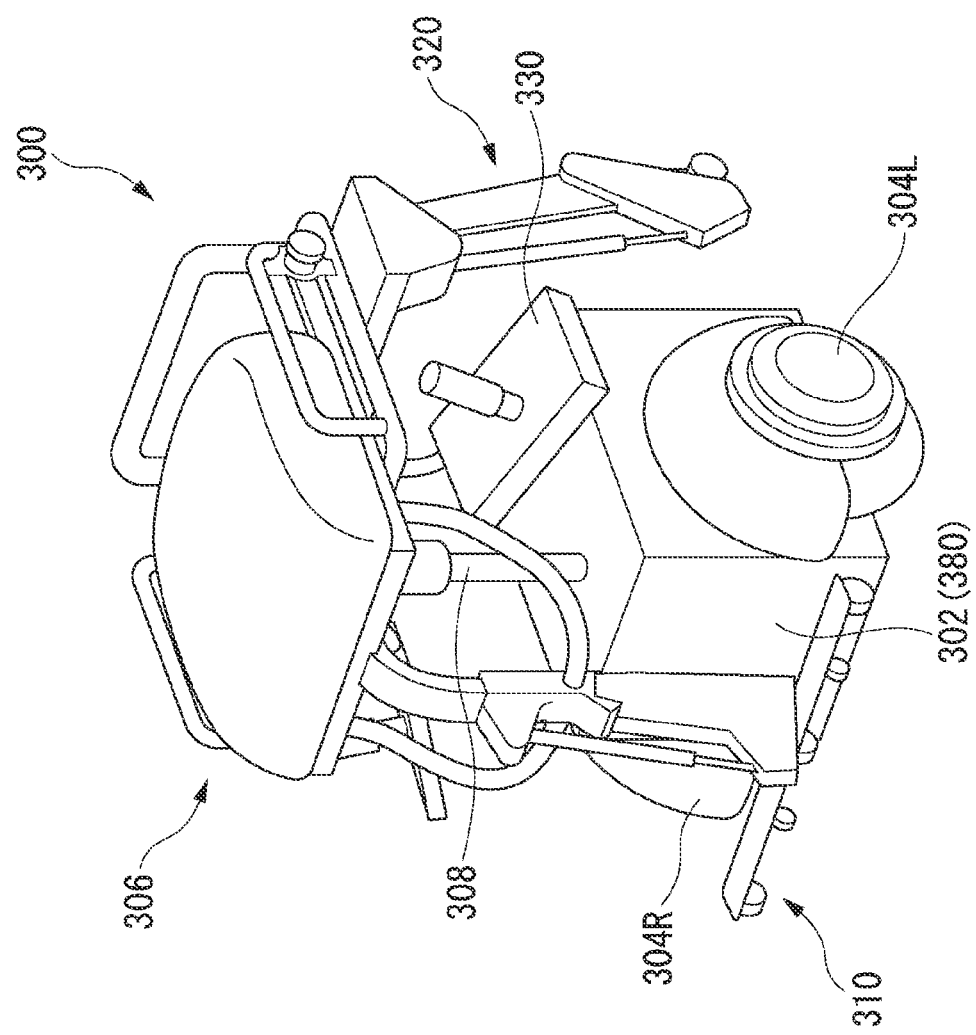
FIG. 3 is a perspective view of the movable body in a case where a seat part is raised by an operation of a lifting mechanism.

FIG. 3 is a perspective view of the movable body 300 in a case where the seat part 306 is raised by an operation of the lifting mechanism 308. FIG. 3 is a perspective view of the movable body 300 when the seat part 306 is raised by the operation of the lifting mechanism 308. The lifting mechanism 308 is an actuator that is formed of, for example, a motor and a ball screw. However, the configuration of the lifting mechanism is not limited thereto and may be, for example, a hydraulic mechanism or a rack-and-pinion mechanism. The lifting mechanism 308 is controlled by the control device 380 and supports the seat part 306 such that the seat part 306 is capable of being raised and lowered relative to the base body 302.

Figure 4:
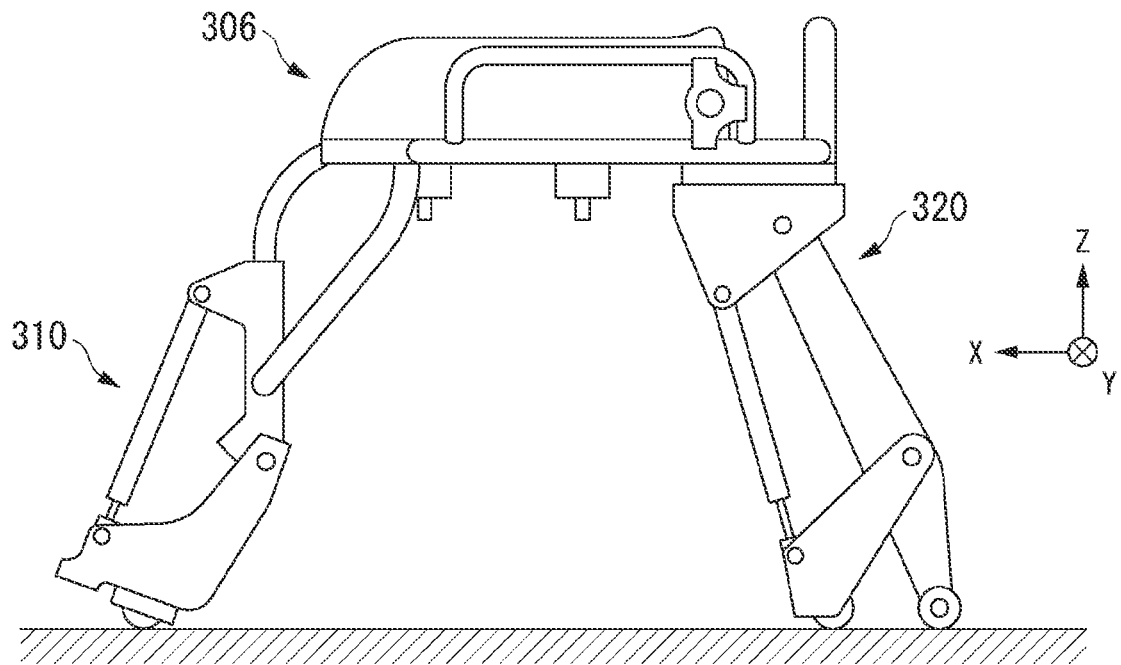
FIG. 4 is a view showing a first support part and a second support part.
Figure 5:
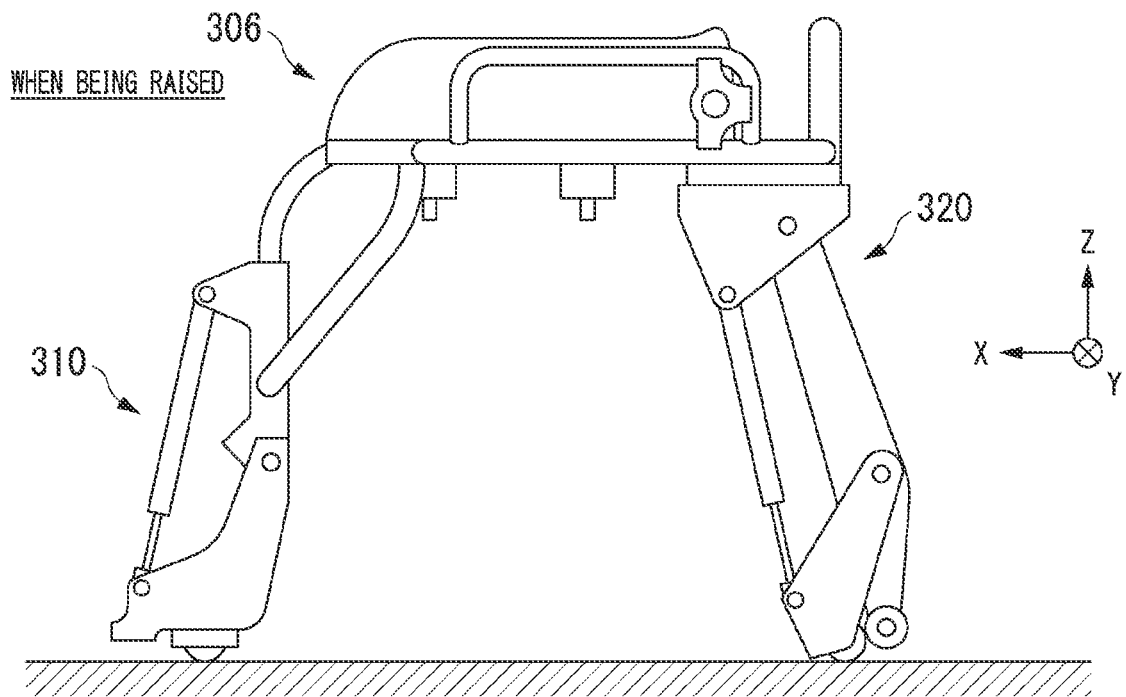
FIG. 5 is a view showing the first support part and the second support part in a case where the height of the seat part is raised.

FIG. 4 is a view showing the first support part 310 and the second support part 320. FIG. 4 and FIG. 5 described below are views of the seat part 306, the first support part 310, and the second support part 320 when seen from the −Y direction. In FIG. 4 and FIG. 5, configurations other than the seat part 306, the first support part 310, and the second support part 320 are omitted.

The first support part 310 is provided on an end part in the +X direction of the seat part 306, extends in a ground direction, and supports the movable body 300 as needed. The second support part 320 is provided on an end part in the −X direction of the seat part 306, extends in the ground direction, and supports the movable body 300 as needed.

The first support part 310 and the second support part 320 are controlled, for example, by a control mechanism 322 (refer to FIG. 6) such as an actuator formed of a motor and a ball screw. The control mechanism 322 is controlled by a control device 380. A ground contact part such as a wheel or a stopper is provided at end parts of the first support part 310 and the second support part 320 on a side close to the ground surface. The first support part 310 and the second support part 320 may have a passive mechanism that comes into contact with the ground in accordance with the height of the seat part 306 by the self-weight of the first support part 310 or the second support part 320, a spring mechanism (suspension), or the like. Further, the first support part 310 and the second support part 320 have a lock mechanism of a movable portion, and the lock mechanism is operated by a control.

For example, when the worker boards the movable body 300, the lifting mechanism 308 lowers the seat part 306 to a lower position on the basis of a control of the control device 380. In accordance with the height of the seat part 306, the ground contact part of the first support part 310 and the second support part 320 is controlled to be located on the ground.

Thereby, for example, the stability when the worker boards the movable body 300 is ensured. When the movable body 300 travels, the first support part 310 and the second support part 320 may be controlled such that the ground contact part is not located on the ground. Thereby, the travel performance of the movable body 300 is improved.

FIG. 5 is a view showing a state of the first support part 310 and the second support part 320 in a case where the height of the seat part 306 is raised. For example, it is assumed that in a case where the worker is boarding the movable body 300, the lifting mechanism 308 raises the height of the seat part 306 on the basis of the control of the control device 380. In this case, in accordance with the height of the seat part 306, for example, the ground contact part of the first support part 310 and the second support part 320 are controlled to be located on the ground by the control of the control mechanism 322 described above, the passive mechanism, or the like. For example, in a case where the height of the seat part 306 of FIG. 5 is higher than the height of the seat part 306 of FIG. 4 described above, each of the first support part 310 and the second support part 320 is controlled to approach the center of the seat part 306 with respect to the X direction, and the ground contact part is located on the ground. Further, at this time, the first support part 310 and the second support part 320 are locked by the lock mechanism described above. Thereby, for example, even in a case where the height of the seat part 306 is raised, the stability of the movable body 300 is ensured.

The first support part 310 and the second support part 320 may have a stretchable or retractable configuration in place of the functional configuration described above. In this case, when the seat part 306 is controlled, the first support part 310 and the second support part 320 may extend and be located on the ground, or the first support part 310 and the second support part 320 may emerge from a storage part and be located on the ground.

Figure 6:
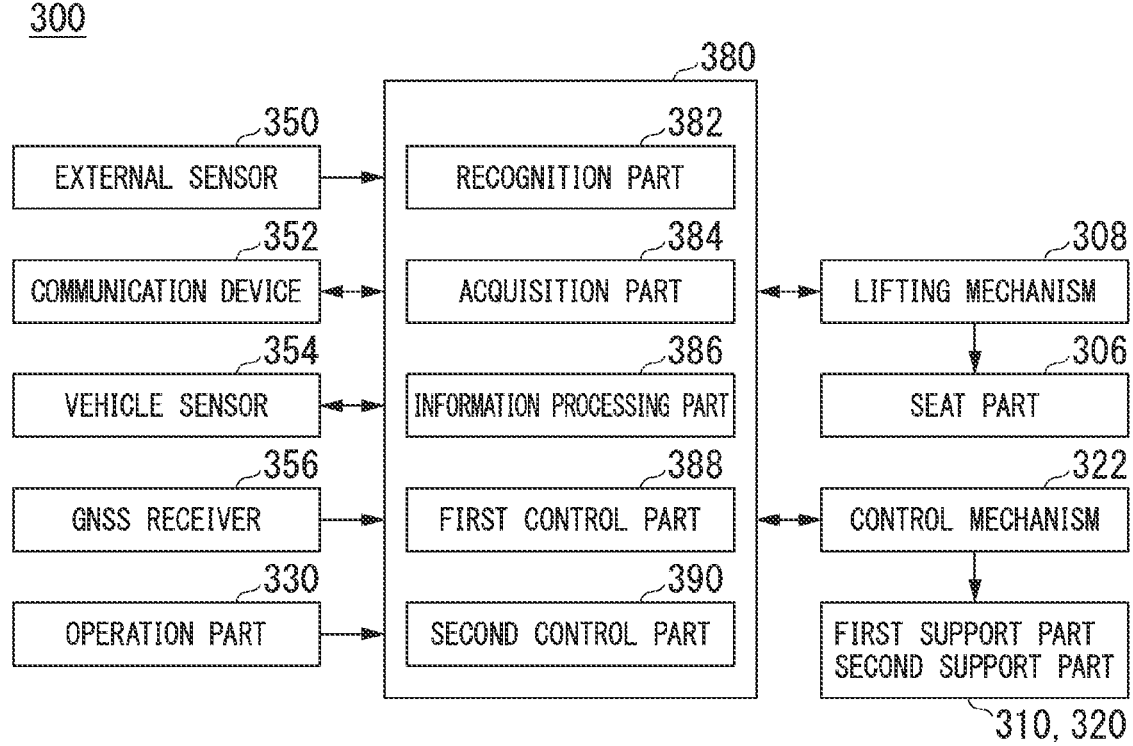
FIG. 6 is a view showing an example of another functional configuration included in the movable body.

FIG. 6 is a view showing an example of another functional configuration included in the movable body 300. The movable body 300 includes, for example, an external sensor 350, a communication device 352, a vehicle sensor 354, a GNSS receiver 356, a secondary battery (not shown), a control device 380, and the like in addition to the functional configuration described above.

The external sensor 350 is, for example, a camera, a laser range finder, an infrared sensor, or the like, and is a functional configuration capable of detecting a situation and an object around the movable body 300. The external sensor 350 is set, for example, at a position where the periphery (for example, the front) of the movable body 300 can be imaged. For example, the external sensor 350 is provided on an end portion of the operation part 330 on the +X direction side or the like. In the following description, as an example, the external sensor 350 is a camera.

The communication device 352 is, for example, a wireless communication module for connecting to the network NW or communicating directly with another terminal device or the like. The communication device 352 performs wireless communication on the basis of Wi-Fi, DSRC, Bluetooth (Registered Trademark), or other communication standards.

The vehicle sensor 354 is a sensor that detects the speed, the acceleration, the angular speed around the vertical axis, or the like of the movable body 300.

The GNSS receiver 356 measures the self-position on the basis of radio waves arriving from a GNSS satellite (for example, a GPS satellite). The GNSS receiver 356 outputs the positioning result to the control device 380.

The control device 380 includes, for example, a recognition part 382, an acquisition part 384, an information-processing part 386, a first control part 388, and a second control part 390. These functional configurations are implemented, for example, by a processor such as a CPU as hardware executing a program (software). Some or all of these functional configurations may be implemented by hardware (a circuit part including circuitry) such as an LSI, an ASIC, a FPGA, or a GPU or may be implemented by software and hardware in cooperation. The program may be stored in advance in a storage device (a storage device including a non-transitory storage medium) such as a HDD or a flash memory. The program may be stored in a removable storage medium (a non-transitory storage medium) such as a DVD or a CD-ROM and be installed in the storage device by the storage medium being mounted on a drive device.

The recognition part 382 recognizes an object around the movable body 300 on the basis of an image captured by the external sensor 350. The recognition part 382 recognizes, for example, the presence or absence of an obstacle, the situation of a road on which the movable body travels, the kind of an object that is present in the vicinity, the position of the object, and the like.

The acquisition part 384 acquires information that is acquired by the communication device 352 or acquires information that is acquired by the vehicle sensor 354 or the GNSS receiver 356. The acquisition part 384 acquires, from the terminal device 100 that is carried by the worker and that receives information which is input by the worker in accordance with the work task, information based on input information which is input by the worker in accordance with the work task. Details of the input information will be described later.

The information-processing part 386 manages the information that is acquired by the acquisition part 384 or controls each item of equipment (equipment other than the equipment as a control target of the first control part 388 and the second control part 390) included in the movable body 300.

The first control part 388 controls the motor of the movable body 300 to cause the movable body 300 to travel. The first control part 388 causes the movable body 300 to travel on the basis of an operation of the operation part 330 or a command of the management device 200. The first control part 388 controls the speed of the movable body 300 on the basis of the information that is acquired by the acquisition part 384.

The second control part 390 controls the lifting mechanism 308 or the control mechanism 322. The second control part 390 controls the lifting mechanism 308 on the basis of an operation of the operation part 330 or a command of the management device 200. The second control part 390 controls the height of the seat part 306 on the basis of the information that is acquired by the acquisition part 384. For example, the second control part 390 acquires an adjustment degree of the height of the seat part 306 and the height of the instrument from the management device 200 and controls the control mechanism 322 on the basis of the acquired information such that the instrument can be readily confirmed in a state where the worker is seated.

[Process Related to Work Task]

The worker boards the movable body 300, moves within a predetermined facility, and performs a work task. The facility is, for example, a facility having a predetermined size such as a substation but is not limited thereto. The work task is, for example, a work task in which a worker performs confirmation, an operation, or treatment of the equipment in the facility or the like. The following embodiment is described using an example in which a worker performs a work task of confirming the information indicated by an instrument in a facility such as a substation.

Figure 7:
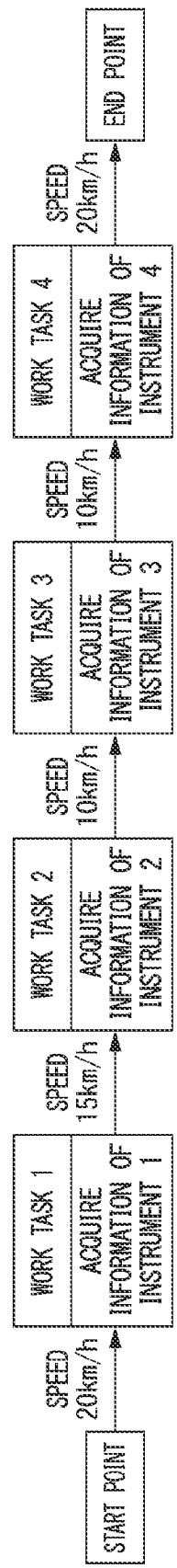
FIG. 7 is a view showing an example of work information stored in a storage part of a management device.

FIG. 7 is a view showing an example of the work information 254 that is stored in the storage part 250 of the management device 200. The work information 254 is information in which a work schedule, the type of work task that is performed by the worker, the equipment (instrument) as a work target, the location (position information) where the work target is provided, the height of the work target (instrument), an upper speed limit, a movement speed of each region where the movable body travels, and the like are associated with one another. The upper speed limit is an upper speed limit of the movable body on a route between work tasks.

The upper speed limit or the movement speed is, for example, a speed that is set on the basis of various types of information such as the distance between instruments, the type of instrument, the type of equipment in the vicinity of where the movable body travels, and the condition of the road surface. For example, in a case where the type of equipment, instrument, or the like near the route on which the movable body 300 travels is equipment, instrument, or the like which the movable body 300 should not approach, the speed of the route on which the movable body travels in the vicinity thereof is set to a low speed.

Figure 8:
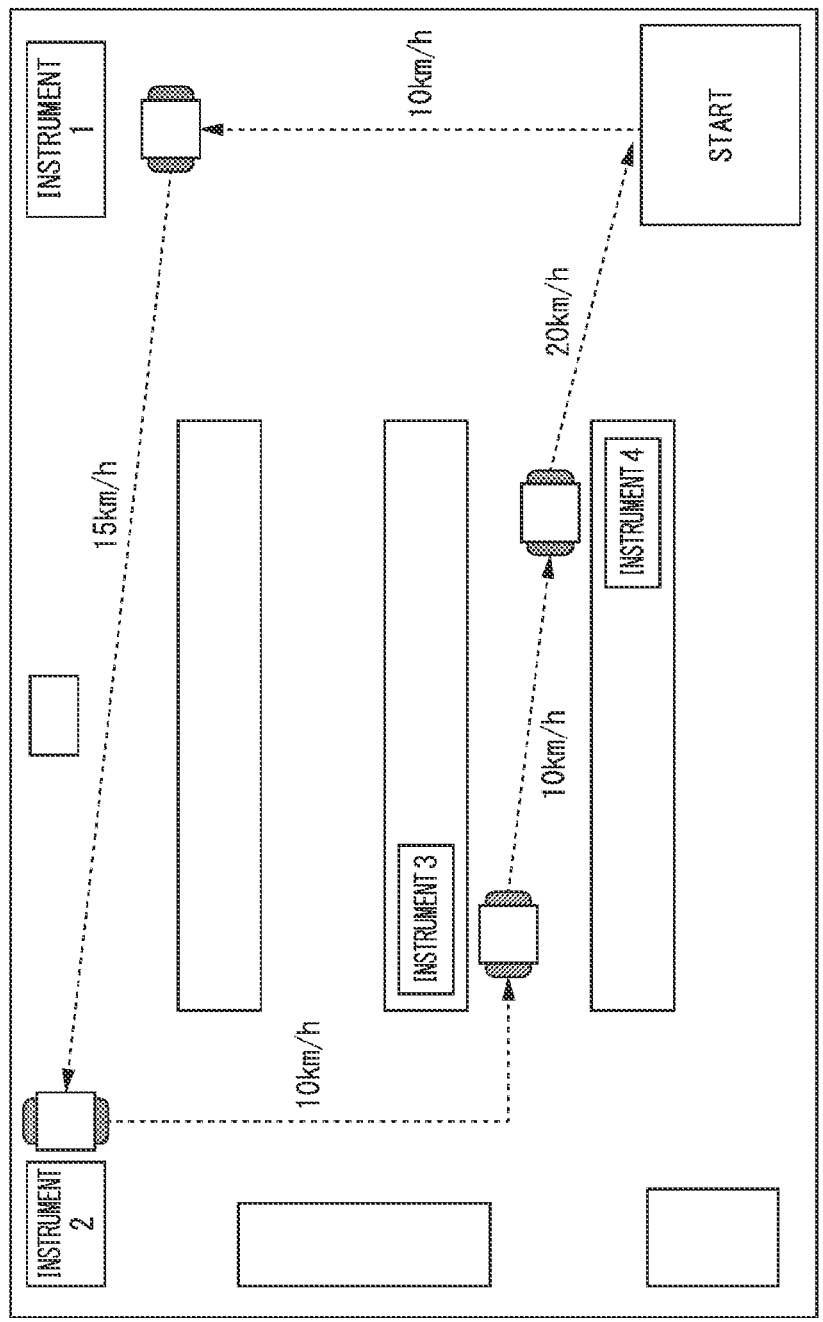
FIG. 8 is a view showing a work schedule.

FIG. 8 is a view showing a work schedule. For example, the work schedule is a schedule of confirming the information indicated by the instrument in order of an instrument 1, an instrument 2, an instrument 3, and an instrument 4. At this time, the upper speed limit of the movable body is set for each movement zone. For example, the upper speed limit when moving from the instrument 1 to the instrument 2 is 15 km/h, and the upper speed limit when moving from the instrument 2 to the instrument 3 is 10 km/h. The upper speed limit is, for example, a speed that is set on the basis of a situation of the movement zone. The speed associated with the zone between the instruments is an example of a "first upper speed limit" or a "second upper speed limit".

For example, the upper speed limit is a speed set in advance by further taking into consideration peripheral equipment that is provided around the movement zone as described above, the broadness of the passage of the movement zone, and the like. When the movable body 300 is present around the instrument or when the worker starts the work task (when an icon IC1 described later or the like is operated), the upper speed limit of the movable body 300 may be set to a predetermined speed or less (for example, a slow speed). The speed of the movable body 300 may be set for each predetermined movement zone in place of each zone between the instruments.

For example, when a worker operates the terminal device 100, starts a service application, and performs a predetermined operation, the service application of the terminal device 100 cooperates with the management device 200. For example, a display part of the terminal device 100 displays identification information of the movable body 300 used by the worker, a work schedule, equipment as a work target included in the work schedule, information in which the equipment and map information of the facility are associated with each other (for example, information as shown in FIG. 8), and the like.

Figure 9:
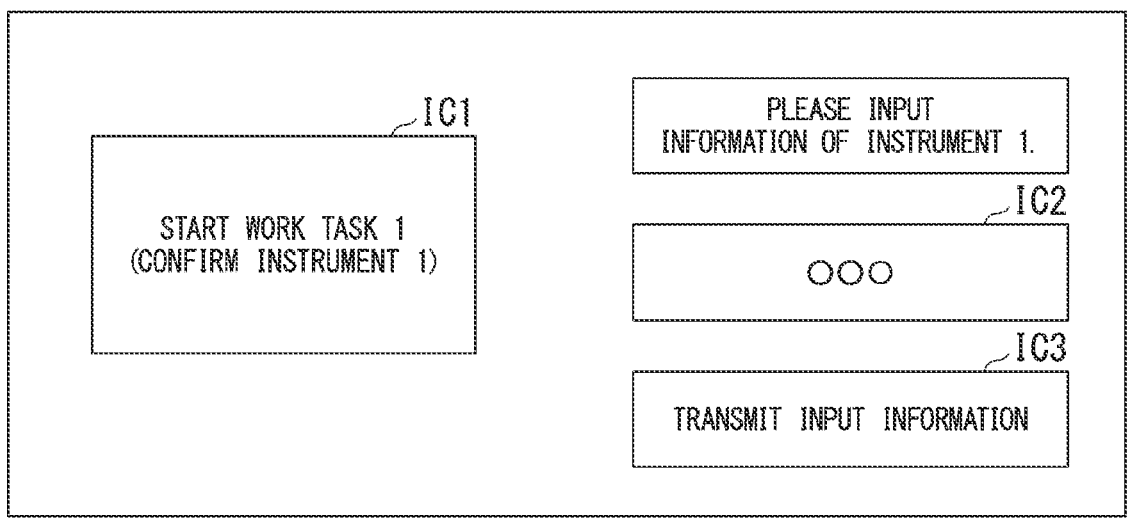
FIG. 9 is a view showing an example of an image.

In a case where the worker boards a designated movable body 300 and, for example, arrives near the instrument 1, an image IM is displayed on the display part of the terminal device 100. FIG. 9 is a view showing an example of an image IM1. The movable body 300 may be moved by an operation of the worker. The movable body 300 may be moved on the basis of an instruction of the management device 200. In this case, the management device 200 causes the movable body 300 to travel toward a destination on the basis of the position information of the movable body 300.

The image IM may be displayed when the worker performs a predetermined operation of the terminal device 100. Alternatively, the terminal device 100 may display the image IM on the display part when the movable body 300 arrives near the instrument 1 on the basis of the position information of the movable body 300.

The image IM includes an icon IC1, an icon IC2, and an icon IC3. The icon IC1 is a button operated when a work task 1 is started. The icon IC2 is an icon in which the information indicated by the instrument 1 is input. For example, in a case where the icon IC1 is operated, when the worker operates the icon IC2, a numeric keypad or the like is displayed on the display part. The worker operates the numeric keypad and inputs the information indicated by the instrument 1. When the worker operates the icon IC3, the information input to the icon IC2 is transmitted to the management device 200.

Information indicating that the icon IC1, the icon IC2, or the icon IC3 is operated is an example of input information.

Information indicating that the icon IC1 is operated is an example of "information indicating that the work task has started". Information that is indicated by the instrument 1 and that is input to the icon IC2 is an example of "information that is indicated by equipment" or "information indicating that the worker has confirmed information that is indicated by equipment which is provided at the workplace". Information indicating that the icon IC3 is operated is an example of "information indicating that the work task has been completed" or "information indicating that the worker has confirmed the information indicating the equipment which is provided at the workplace". "Information based on input information" is, for example, information (for example, information of a command of an upper speed limit) transmitted to the movable body 300 by the management device 200 in response to the management device 200 acquiring the input information described above.

In response to an operation of the icon, the management device 200 transmits an upper speed limit to the movable body 300. The movable body 300 acquires an upper speed limit that is transmitted by the management device 200. Then, the movable body 300 sets an upper speed limit when proceeding to a position where the next work task is performed to the upper speed limit that is provided by the management device 200. Thereby, the movable body 300 can proceed to the position where the next work task is performed at the upper speed limit or less.

[Sequence View]

Figure 10:
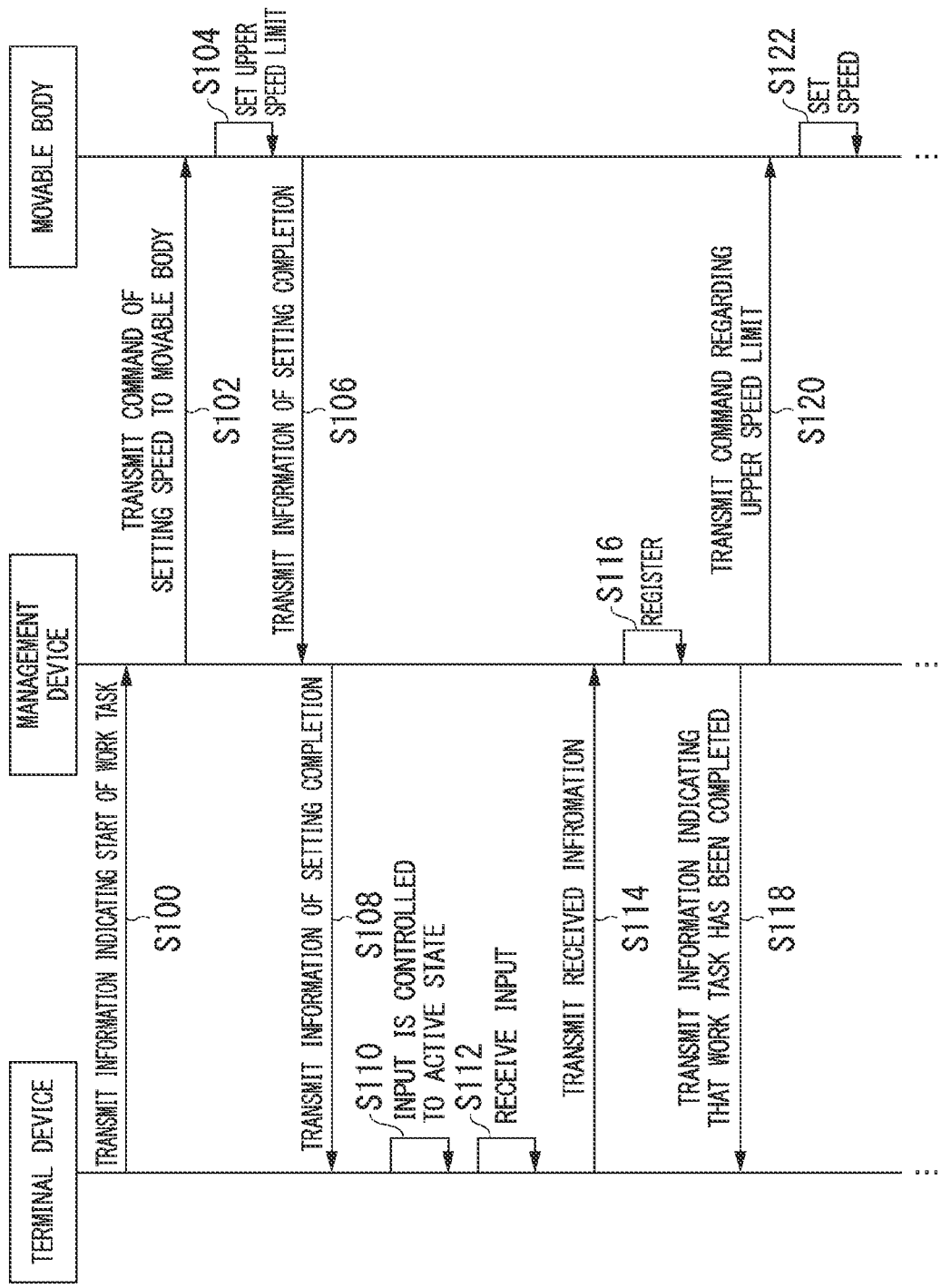
FIG. 10 is a sequence view showing an example of a flow of a process performed by a movable body management system.

FIG. 10 is a sequence view showing an example of a flow of a process performed by the movable body management system 1. First, the terminal device 100 transmits start information indicating the start of a work task to the management device 200 (Step S100). The start information is, for example, information indicating that the icon IC1 has been operated and includes identification information of the instrument as the work target.

Next, when the start information is acquired, the management device 200 transmits a command (information based on input information) regarding an upper speed limit in order to cause the movable body 300 to set the upper speed limit with reference to the work information 254 (Step S102).

Next, the movable body 300 sets the upper speed limit on the basis of the command in Step S102 (Step S104) and transmits, to the management device 200, information indicating that the setting has been completed after the setting is completed (Step S106). The upper speed limit at this time is an upper speed limit that is set when the movable body 300 is present near the instrument. For example, this upper speed limit is a slow speed.

When the information transmitted in Step S106 is acquired, the management device 200 transmits the acquired information indicating that the setting has been completed to the terminal device 100 (Step S108). When the information transmitted in Step S108 is acquired, the terminal device 100 controls the input of the icon IC2 from an inactive state to an active state (Step S110). The inactive state is a state in which the terminal device 100 does not receive information being input to the icon IC2. The active state is a state in which the terminal device 100 receives information being input to the icon IC2. The upper speed limit of the movable body 300 is set to a slow speed as described above, and thereby, a state in which the movable body 300 is stable is further reliably maintained. As a result, the worker can confirm the information indicated by the instrument and input the confirmed information to the terminal device 100 with ease.

After the process of Step S110, the terminal device 100 receives an input of information with respect to the icon IC2 (Step S112) and transmits the received information (for example, information indicated by the instrument) to the management device 200 (Step S114). Next, the management device 200 registers the information transmitted in Step S114 to the instrument information 256 (Step S116). Thereby, the management device 200 deems that the work task with respect to the target equipment has been completed.

When the work task has been completed, the management device 200 transmits information indicating that the work task has been completed to the terminal device 100 (Step S118). Next, the management device 200 transmits a command regarding the upper speed limit to the movable body 300 on the basis of a position to which the movable body proceeds after the work task and where the next work task is performed (Step S120). The movable body 300 sets the upper speed limit when acquiring the command regarding the upper speed limit (Step S122). Then, the movable body 300 travels toward a position where the work task is performed automatically or on the basis of the operation of the worker in order to perform the next work task at the upper speed limit or less. At this time, the movable body 300 may use a speaker or the like and report, by way of speech, the information (information of the kind of work task, target equipment, a movement direction, and the like) regarding the next work task on the basis of the information acquired from the management device 200.

In this way, by the movable body 300 adjusting the speed of the movable body 300 in accordance with the progress of the work task, convenience to the worker is improved, and useful control for a facility operation is further realized.

According to the first embodiment described above, the control device 380 can realize useful control for the worker or the facility operation on the basis of the information based on input information that is input by the worker in accordance with the work task from the terminal device 100.

The above embodiment is described using an example in which the upper speed limit is controlled on the basis of the information based on the input information. Alternatively, the movable body 300 may control the upper speed limit by further taking into consideration the following predetermined information.

The predetermined information is, for example, some or all of the following information (1) to (6).

(1) Degree of congestion of passage (refer to <First modified example>)

(2) Use history of worker (refer to <Second modified example>)

(3) State of battery

For example, the management device 200 acquires a charging rate of a battery (battery state) of the movable body 300 at a predetermined interval. When it is determined that the acquired charging rate is equal to or lower than a threshold value, the management device 200 commands the movable body 300 to set the upper speed limit to be lower than an upper speed limit in a case where the charging rate exceeds the threshold value.

(4) State of road surface

The management device 200 may acquire the condition of the road surface and may set the upper speed limit on the basis of the acquired condition of the road surface. For example, when the management device 200 acquires information of rainy weather or information indicating a temperature at which a road is frozen from a weather information-providing server (not shown), the management device 200 commands the movable body to set the upper speed limit to an upper speed limit that is lower than that in a case where it is not rainy weather or in a case where a road is not frozen.

The management device 200 may set the upper speed limit on the basis of a position where the road surface is uneven or a position where the road surface is damaged that is input by a worker or a facility manager operating the terminal device 100 or another device. For example, the management device 200 may acquire position information of the movable body 300 at a predetermined interval, and when the movable body 300 passes near the position where the road surface is uneven or the position where the road surface is damaged, the management device 200 may command the movable body 300 to set the upper speed limit to be lower than when traveling at another position.

The management device 200 may set the upper speed limit on the basis of a speed of each zone in a case where each of a plurality of workers boards the movable body 300 and travels. The management device 200 may derive, for example, an average speed (an average maximum speed or an index regarding a statistically processed speed) for each zone in the case described above, and when the derived average speed is lower than an upper speed limit that is set for the zone in advance, the management device 200 may command the movable body 300 to set the derived average speed as the upper speed limit. For example, it is estimated that a zone where the average speed is low is in a situation in which the road condition is relatively unsuitable for the movable body 300 to move. Information of a worker who has a learning level that is equal to or more than a predetermined degree with respect to boarding on the movable body 300 may be used for deriving the average speed. The learning level being equal to or more than a predetermined degree means, for example, that an index indicating the learning level is equal to or more than a threshold value, such as the number of boarding times being equal to or more than a predetermined number of times or the boarding history being equal to or more than a predetermined period of time.

(5) Learning level

The management device 200 may command the movable body 300 to set an upper speed limit in a case where a worker having a learning level that is less than a predetermined degree boards the movable body 300 to be lower than an upper speed limit in a case where a worker having a learning level that is equal to or more than a predetermined degree boards the movable body 300. The management device 200 maintains the learning level of the worker in advance. This information is provided from the terminal device 100 to the management device 200 by operating the terminal device 100 and inputting identification information of the worker and identification information of the movable body 300 which the worker boards or the like when the worker boards the movable body 300.

(6) Position of movable body 300 (or type of passage)

The management device 200 may set an upper speed limit on the basis of position information of the movable body 300.

For example, the management device 200 sets the upper speed limit of the movable body 300 on the basis of map information and the position information of the movable body 300. For example, when the movable body 300 is traveling through an indoor passage, the upper speed limit is set to a first upper speed limit, and when the movable body 300 is traveling through an outdoor passage, the upper speed limit is set to a second upper speed limit. The first upper speed limit is a speed that is smaller than the second upper speed limit. This is because, for example, the road surface of the indoor passage is relatively more suitable for traveling of the movable body 300 than the road surface of the outdoor passage.

First Modified Example

Hereinafter, a first modified example is described. In the first modified example, the upper speed limit of the movable body 300 is set in accordance with the degree of congestion of a passage. Hereinafter, the difference from the first embodiment is mainly described.

Figure 11:
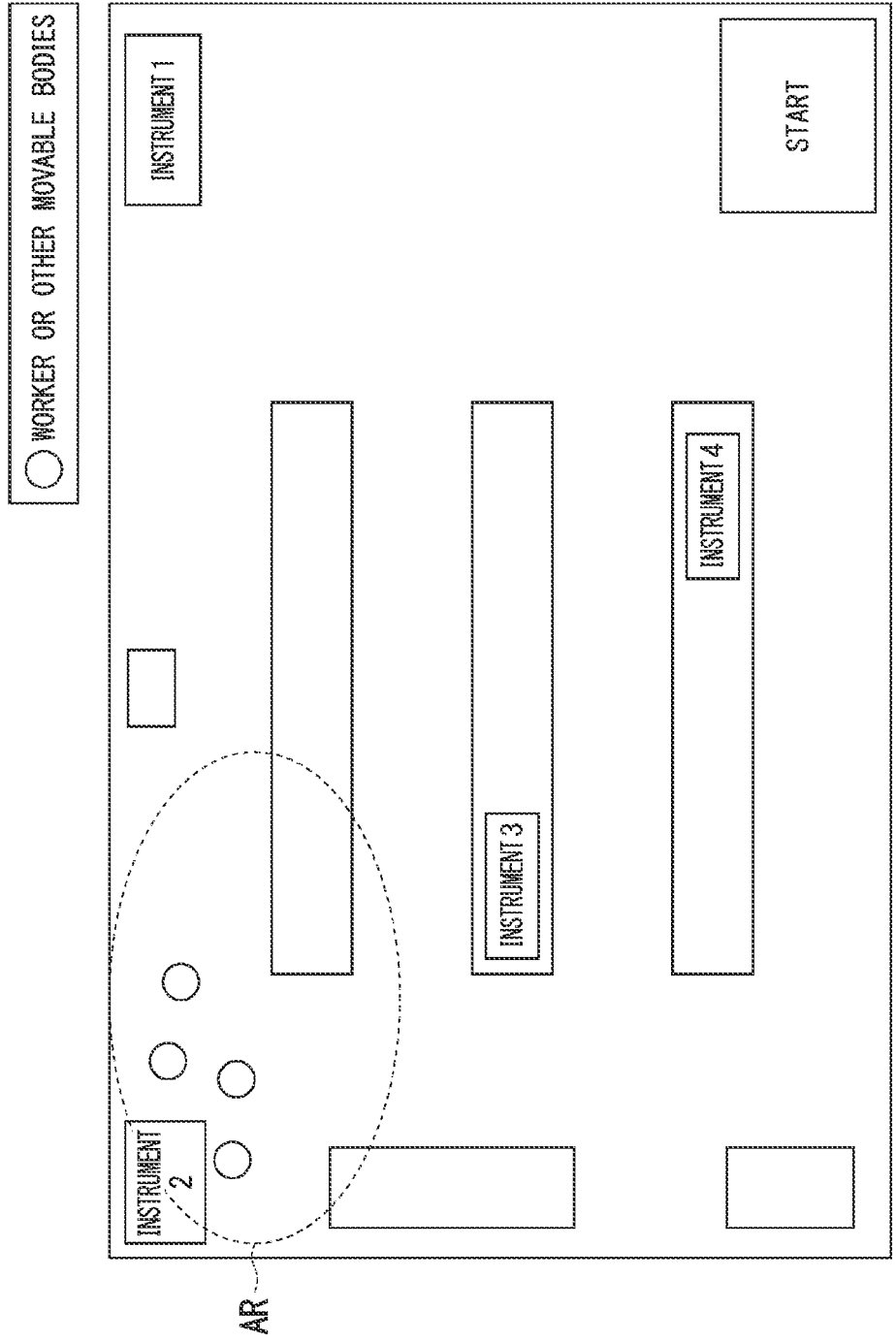
FIG. 11 is a view showing the setting of an upper speed limit of a first modified example.

FIG. 11 is a view showing the setting of an upper speed limit of the first modified example. For example, the management device 200 acquires the position information of the movable body 300 that is present in the facility and the position information of the worker. The management device 200 derives the degree of congestion in the facility on the basis of the acquired position information and sets an upper speed limit for each area on the basis of the derived degree of congestion. Such position information is provided by the movable body 300 or the terminal device 100 carried by the worker. For example, the management device 200 sets the upper speed limit of the movable body in an area AR which includes a congested area where a plurality of workers or movable bodies are present as shown in FIG. 11 to be lower than an upper speed limit when traveling in another area.

The degree of congestion described above may be derived on the basis of work information 254. The management device 200 may derive the degree of congestion, for example, on the basis of a work time and a position where the worker will be present in the future based on a work schedule of another worker included in the work information 254. Information of a time when the worker works, a work target, a route on which the worker moves, and a movement time are included in the work schedule.

According to the first modified example described above, the movable body 300 sets the upper speed limit by taking into account the degree of congestion, and thereby, it is possible to perform traveling further in accordance with the situation of the facility.

Second Modified Example

Hereinafter, a second modified example is described. In the second modified example, the upper speed limit is set on the basis of a use history of a worker. Hereinafter, the difference from the first embodiment is mainly described.

FIG. 12 is a view showing an example of history information 260 of a worker stored in the storage part 250 of the management device 200. The history information 260 is, for example, information in which identification information of a worker and an upper speed limit of each zone when boarding the movable body 300 are associated with each other. The management device 200 may set an upper speed limit for each combination between a worker and a zone with reference to the history information 260. For example, the management device 200 sets the default upper speed limit to a slower upper speed limit for a worker who is traveling at a slower speed than the default upper speed limit in a predetermined zone on the basis of the history information 260 and sets the default upper speed limit to a faster upper speed limit for a worker who is traveling for a long time at the default upper speed limit in a predetermined zone.

According to the second modified example described above, the management device 200 commands the movable body 300 to set an upper speed limit that is suitable for the worker with reference to the history information 260, and thereby, convenience to the worker is improved. For example, the movable body 300 is prevented from traveling at an unaccustomed speed for the worker.

The embodiments described above may be appropriately combined and performed. Some or all of the functional configurations included in the movable body 300 may be included in the management device 200. Some or all of the functional configurations included in the management device 200 may be included in the movable body 300. The management device 200 may be omitted, and the movable body 300 may control the speed independently of a command of the management device 200. In this case, for example, the movable body 300 and the terminal device 100 communicate with each other.

The above embodiment is described using an example in which the speed of the movable body 300 is controlled; however, the acceleration, the route, the steering degree, and the like of the movable body 300 may be controlled in place of (or in addition to) the speed.

The embodiments described above can be represented as follows.

A movable body control device controls a movable body which a worker who performs a work task at a workplace is capable of boarding and which is capable of traveling in a state where the worker is boarding, the control device including a storage device that stores a program and a hardware processor and being configured to: acquire, from a terminal device that is carried by the worker and that receives information which is input by the worker in accordance with the work task, information based on input information which is input by the worker in accordance with the work task; and control a speed of the movable body based on the information which is acquired by executing the program.

Although the embodiments of the present invention have been described with reference to the drawings, the present invention is not limited to such embodiments, and various modifications and substitutions can be made without departing from the scope of the invention.

What is claimed is:

1. A movable body control device that controls a movable body which a worker who moves within a facility and performs a work task of confirming information that is indicated by equipment which is provided in the facility is capable of boarding and which is capable of traveling in a state where the worker is boarding, the movable body control device comprising:
   a processor that functions as:
   an acquisition part that acquires, from a terminal device that is carried by the worker and that receives information which is input by the worker in accordance with the work task, information based on input information which is input by the worker in accordance with the work task; and
   a control part that controls a speed of the movable body based on the information which is acquired by the acquisition part,
   wherein the control part sets a first upper speed limit and a second upper speed limit,
   the work task includes a first work task and a second work task that are performed by the worker,
   the first upper speed limit is an upper speed limit that is set when moving from a position where the first work task is performed to a position where the worker performs the second work task that is performed next, and the second upper speed limit is an upper speed limit that is set when moving from the position where the worker performs the second work task to a position where the worker performs a third work task that is performed next.

2. The movable body control device according to claim 1, wherein the input information is information indicating that the work task has started, information that is indicated by equipment which is provided in the facility, information indicating that the worker has confirmed information that is indicated by equipment which is provided in the facility, or information indicating that the work task has been completed.

3. The movable body control device according to claim 1, wherein the control part sets an upper speed limit of the movable body based on a work schedule of a different worker and the information based on the input information.

4. The movable body control device according to claim 1, wherein the control part sets an upper speed limit of the movable body based on predetermined information and the information based on the input information, and the predetermined information includes at least one of
a degree of congestion near a first passage on which the movable body travels,
a use history of the movable body by the worker,
a state of a battery mounted on the movable body,
a state of a road surface of a second passage on which the movable body is scheduled to travel,
a learning level regarding use of the movable body of the worker, and
a type of the second passage on which the movable body is scheduled to travel.

5. A movable body which a worker who moves within a facility and performs a work task of confirming information that is indicated by equipment which is provided in the facility is capable of boarding and which is capable of traveling in a state where the worker is boarding, on which a movable body control device is mounted, and which is controlled by the movable body control device, the movable body comprising:

a processor that functions as:
an acquisition part that acquires, from a terminal device that is carried by the worker and that receives information which is input by the worker in accordance with the work task, information based on input information which is input by the worker in accordance with the work task; and
a control part that controls a speed of the movable body based on the information which is acquired by the acquisition part, wherein the control part sets a first upper speed limit and a second upper speed limit,
the work task includes a first work task and a second work task that are performed by the worker,
the first upper speed limit is an upper speed limit that is set when moving from a position where the first work task is performed to a position where the worker performs the second work task that is performed next, and
the second upper speed limit is an upper speed limit that is set when moving from the position where the worker performs the second work task to a position where the worker performs a third work task that is performed next.

6. A movable body control method by way of a computer that controls a movable body which a worker who moves within a facility and performs a work task of confirming information that is indicated by equipment which is provided in the facility is capable of boarding and which is capable of traveling in a state where the worker is boarding, the movable body control method including:

acquiring, from a terminal device that is carried by the worker and that receives information which is input by the worker in accordance with the work task, information based on input information which is input by the worker in accordance with the work task; and controlling a speed of the movable body based on the information which is acquired, wherein a first upper speed limit and a second upper speed limit are set, the work task includes a first work task and a second work task that are performed by the worker, the first upper speed limit is an upper speed limit that is set when moving from a position where the first work task is performed to a position where the worker performs the second work task that is performed next, and the second upper speed limit is an upper speed limit that is set when moving from the position where the worker performs the second work task to a position where the worker performs a third work task that is performed next.

7. A computer-readable non-transitory recording medium which includes a program causing a computer that controls a movable body which a worker who moves within a facility and performs a work task of confirming information that is indicated by equipment which is provided in the facility is capable of boarding and which is capable of traveling in a state where the worker is boarding to:

acquire, from a terminal device that is carried by the worker and that receives information which is input by the worker in accordance with the work task, information based on input information which is input by the worker in accordance with the work task; and control a speed of the movable body based on the information which is acquired, wherein a first upper speed limit and a second upper speed limit are set, the work task includes a first work task and a second work task that are performed by the worker the first upper speed limit is an upper speed limit that is set when moving from a position where the first work task is performed to a position where the worker performs the second work task that is performed next, and the second upper speed limit is an upper speed limit that is set when moving from the position where the worker performs the second work task to a position where the worker performs a third work task that is performed next.

* * * * *